Figure 5:
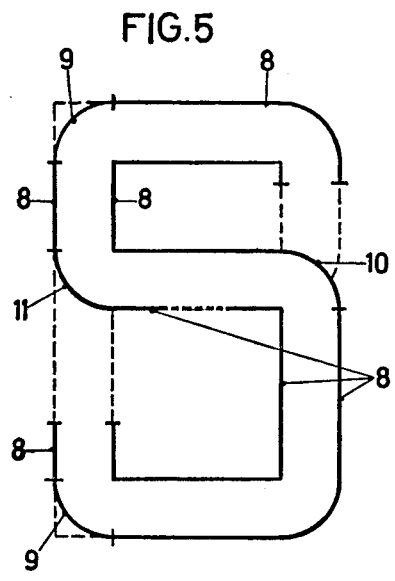

United States Patent [19]
Vicent

[11] 3,716,921
[45] Feb. 20, 1973

[54] TEMPLATE FOR TRACING SMALL AND CAPITAL LETTERS AND NUMBERS

[75] Inventor: Fernando Suarez Vicent, Coruna, Spain

[73] Assignee: Manuel Lainz S.A., Santander, Spain

[22] Filed: May 27, 1970

[21] Appl. No.: 41,013

[30] Foreign Application Priority Data

May 27, 1969 Spain......................................148972
Jan. 9, 1970 Spain......................................154884

[52] U.S. Cl. ..............................................33/174 B
[51] Int. Cl. ..............................................B43l 13/20
[58] Field of Search..35/26, 37; 33/64 R, 64 D, 64 E, 33/174 B; D52/6.1

[56] References Cited

UNITED STATES PATENTS

| | | | |
|---|---|---|---|
| 147,942 | 2/1874 | Hutchinson | 33/174 B |
| 1,063,969 | 6/1913 | Hackes | 33/174 B |
| 1,307,736 | 6/1919 | Hepfinger | 33/174 B |
| 1,593,353 | 7/1926 | Pollock | 33/174 B |
| 1,686,160 | 10/1928 | Klimowicz | 33/174 B |
| 1,797,035 | 3/1931 | Wilson | 33/174 B |
| 3,537,202 | 11/1970 | Braun et al. | 35/35 J X |

FOREIGN PATENTS OR APPLICATIONS 412,120 6/1934 Great Britain......................33/174 B

*Primary Examiner*—Harland S. Skogquist
*Attorney*—Fleit, Gipple & Jacobson

[57] ABSTRACT

A template for tracing letters with two openings, a plurality of notches on the outer edge and a trapezoidal holding means.

5 Claims, 11 Drawing Figures

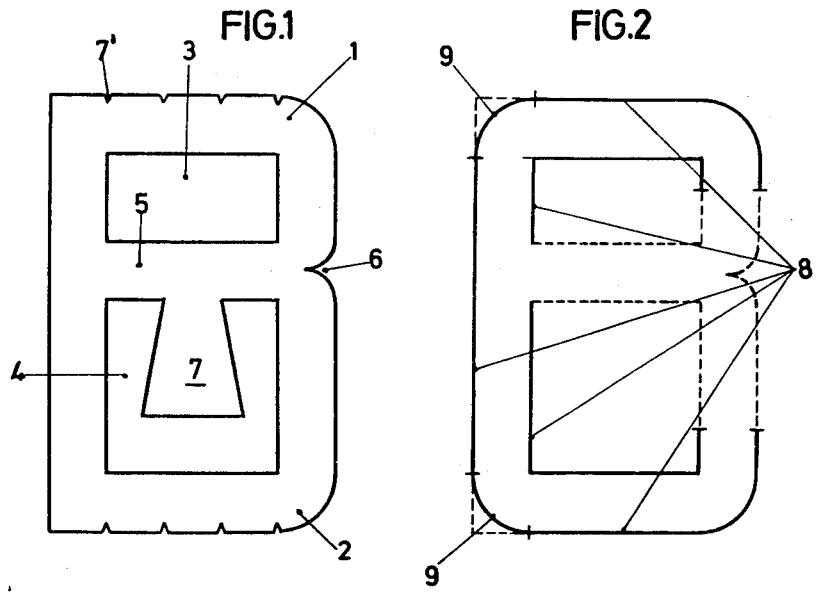
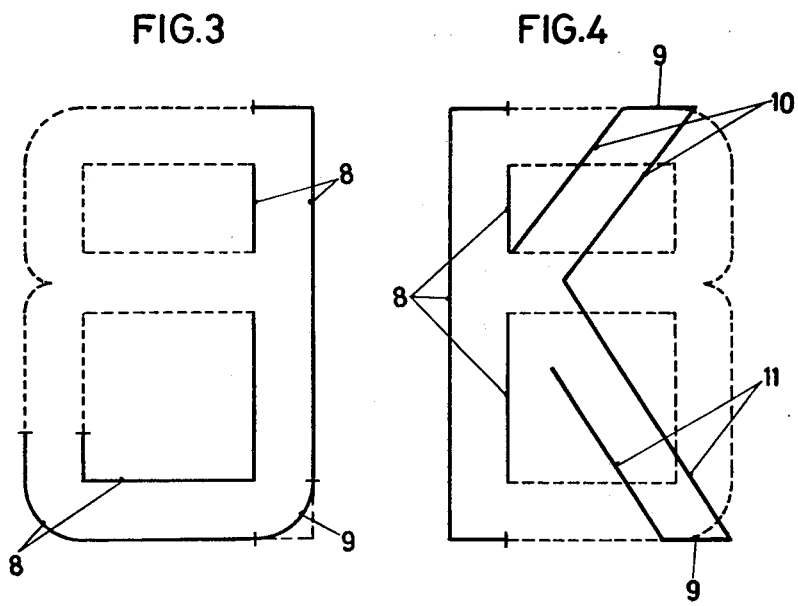

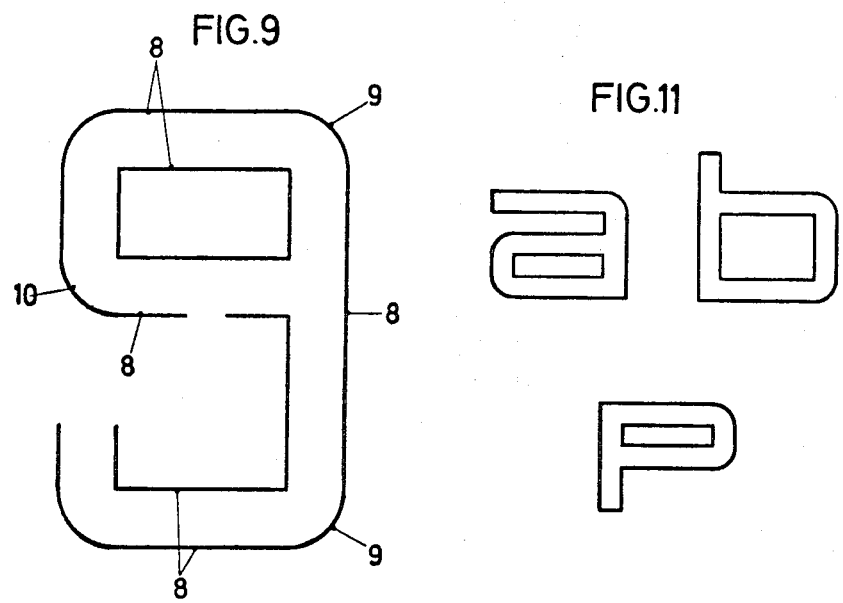
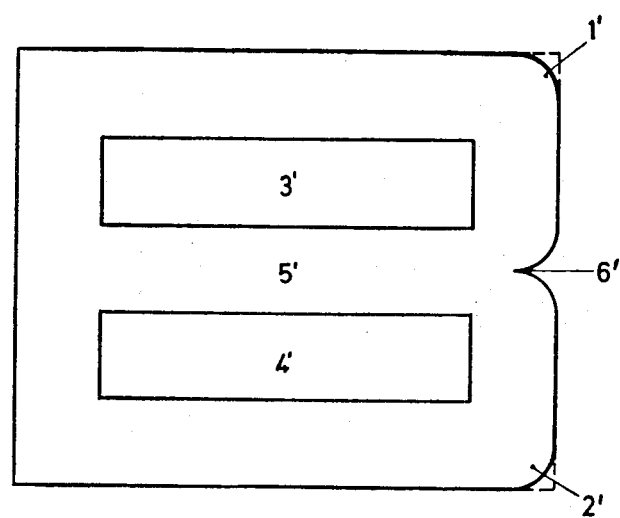

TEMPLATE FOR TRACING SMALL AND CAPITAL LETTERS AND NUMBERS

The present invention relates to a stencil or template for tracing letters and numbers, which has great simplicity in use, a considerable economy of time and which makes it possible to effect the tracing of all the letters of the alphabet, as well as the numbers from 1 to 0, which can be manufactured in any size desired without any limitation.

At present two types are known and used for the tracing of letters and numbers, differing from each other by the size of the character which it is desired to obtain.

For the lettering or inscription of letters or numbers of reduced size there are used templates which make use of all the characters. When the size of the letter or number is large there are used individual templates, each of which corresponds to one of the characters to be inscribed.

In the first case the type of template mentioned can only be used to inscribe characters of small dimensions on coverings, documents, drawing etc. In the second case the templates can be used for inscribing the type of symbol or letter which is desired, whatever its dimensions may be, however it is necessary to make use of as many templates as there are letters in the alphabet as well as a template for each one of the numbers from 1 to 0, it being necessary to change the template every time that a new character has to be traced.

The template of the invention obviates all the previous disadvantages since it can be used for tracing any type of letter, in particular for tracing characters of large dimensions, without the necessity of having to change the template, since a single one makes it possible to effect the tracing of all the letters of the alphabet, in addition to all the numbers from 1 to 0.

In accordance with a first mode of embodiment of the invention there is provided a template of flat construction, for the tracing of capital letters and numbers which is characterized in that it is of substantially rectangular shape and has two inner openings or apertures, separated from one another by a transverse strip of equal width to the strip forming the outline of the template.

The template is provided on two of its outer corners, corresponding to one of the sides of greater length with portions rounded off through an arc of 90° and this side has an angular notch with its sides rounded to a 90° arc whose vertex is situated in the center of the transverse strip.

The template has on its upper and lower edges four equidistant notches or marks, separated from one another and from the lateral edges by a distance equal to the width of the outline strip and therefore of the transverse strip, which has the function besides giving uniformity to the characters, of fixing the starting points so that the tracing is uniform all the time.

The dimensions of the template can be any desired, according to the type of letter to be obtained, but taking into account the fact that the width of the latter will be equal to five times the width of the outline strip. The outer angular notch will preferably be situated at a height of 60 percent of the total height measured from the lower edge, although it may be situated in the central part or at a height of 30% of the total height, varying with the type of letter to be obtained. The position of this angular notch determines the position of the inner transverse band.

There extends from the transverse strip already mentioned a tongue, preferably of trapezoidal shape, which in addition to facilitating the tracing of any of the letters, serves as a holding element for the template.

With these templates it is possible to trace the outline of all the capital and letters, there then being only necessary a movement of the templates in order to complete the tracing of the letter desired.

Some of the letters can be obtained starting from a single position of the templates, while for others it is necessary to move the templates in one direction or the other so that by means of two or more positions of these latter, there is obtained the outline of the letter desired.

In the last case one starts from the normal positions of the templates in the vertical position, with which there is marked part of the outline of the letter which it is desired to obtain. The limit of these initial lengths makes it necessary to take up the successive oblique positions of the templates in order to complete the outline of the letter.

The templates of the invention, which are of laminar construction, can be manufactured in different materials and also in different sizes, this depending on the size of lettering which it is desired to obtain.

The form and operation of the templates will be understood more easily from the following description, with reference to the attached drawings, in which there is shown one form of embodiment give non-restrictively by way of example, of each of the said templates and in which:

FIG. 1 corresponds to the template for tracing capital letter and numbers.

FIGS. 2, 3, 4, 5, 6, 7, 8 and 9 reproduce a series of capital letters and numbers obtained with the template in FIG. 1.

FIG. 10 corresponds to a construction of the template in FIG. 1, with equal openings.

FIG. 11 shows 3 letters on a smaller scale obtained with the template in FIG. 10.

The template shown in FIG. 1, which is of laminar construction, has a substantially rectangular form, with two of its corners 1 and 2 corresponding to one of the longer sides rounded off to a 90° arc. The template has interiorly two openings or apertures 3 and 4.

The strip forming the outline of the entire template is of uniform width equal to that of the transverse strip 5 which separates the already mentioned openings 3 and 4.

On the longer side comprised between the corners 1 and 2 there is provided an angular notch 6 with its sides rounded off to a 90° arc, the vertex of this angular notch 6 coinciding with the center of the width of the transverse strip 5.

A tongue 7 of trapezoidal shape extends from one of the edges of this central band 5 and which besides completing the tracing for some letters, serves as a holding element for the template. The lower edge of this tongue 7 is situated at a distance from the inner edge parallel to the lower length of the outline strip equal to the width of said outline strip.

In FIGS. 2 to 9 there are given some examples of how the letters and numbers can be obtained. In all these Figures the reference number 8 indicates the lines which are obtained with the first position of the template; with the reference numeral 9 the lines which are obtained with the second position; with the reference numeral 10 those which are obtained with the third position and with the reference numeral 11 the lines obtained with the fourth and last position of the template.

FIG. 2 corresponds to the letter C, which obtains in the first position of the template the whole of the same, excepting the rounded off corners 9 which are obtained by reversing the position of the template.

FIG. 3 corresponds to the letter J which is obtained with the template in the vertical position shown in this Figure, excepting the line 9 for which it is necessary to reverse the position of the template.

The letter K which is shown in FIG. 4 is obtained by varying four times the position of the template. The lines 8 are obtained in the first position of the template. The lines 10 and 11 are obtained with the longest straight length of the template by suitably inclining it and taking as starting points the lines 9 obtained in the second position of the template.

In the S in FIG. 5 the lines 8 are obtained in the first position of the template, the full outline of which is completed by the extension of the dashed lines. The lines 9 are obtained by reversing the position of the template; the line 10 is obtained by shifting the template longitudinally downwards to the first position; and the line 11 is obtained last with the template in the overturned position, by means of one of its rounded off corners.

Figure 6:
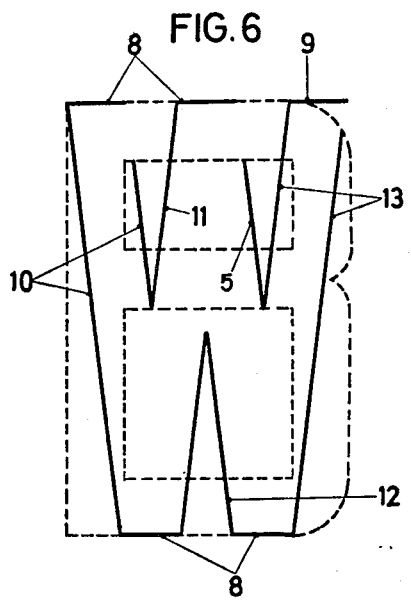

For the W shown in FIG. 6 the lines 8 are obtained with the template in the position indicated by means of dashed lines also indicating the starting point of the line 9. The lines 10, 11, 12 and 13 are obtained by inclining the template in one direction or the other.

Figure 7:
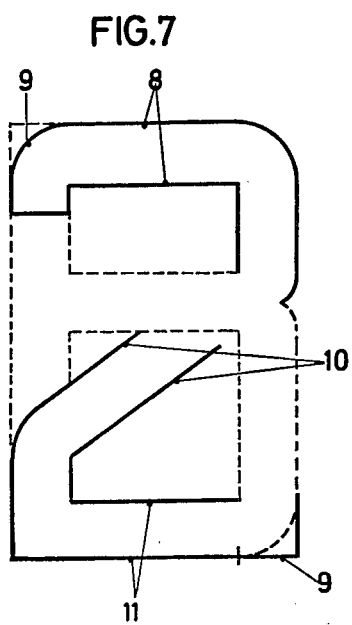
Figure 8:
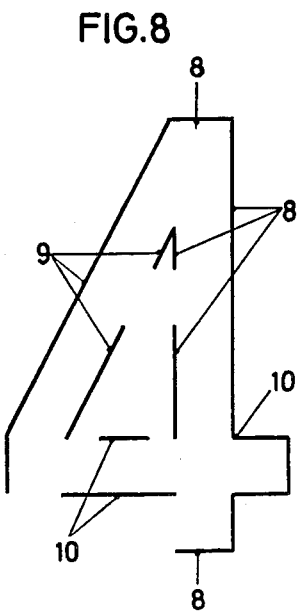

In the way there are obtained the numbers shown in FIGS. 7, 8 and 9 in which the lines 8 are obtained in the first position of the template, shown by means of dashed lines in FIG. 7. The rest is as in the previous instances.

In order to obtain all the letters of the alphabet and the numbers from 1 to 0 the operations are effected in the same manner as that shown previously for those letters and numbers represented in the drawings.

In FIG. 10 there is shown an elongated template which gives some idea of the variations which can be introduced in the template in FIG. 1 as regards its shape and proportions. The openings and apertures 3' and 4' are equal in this case.

In the template in FIG. 1 the notch 6 is situated at a height of 60 percent of the total height measured from the lower edge, while in FIG. 10 it is located in the central part, it being possible for it to be provided at a height of 30 percent of the total height, the position of the central band 5 varying similarly.

Finally in FIG. 11 there are shown letters obtained with an elongated template with equal openings.

In the manner described there is obtained all the letters and numbers by means of a single position of the template or with two or more positions, by moving or rotating the same. In the case where more than one position is necessary, the second and subsequent positions for completing the outline are necessitated by the limits of the lines obtained in the preceding positions.

Whatever material the templates are made of, it is possible to provide them with magnetized components which enable them to be secured to any ferromagnetic surface on which it is desired to inscribe a letter or character, such as ships' hulls, tanks, silos, etc., thus facilitating the lettering operation.

I claim:

1. A template for tracing capital letters and numbers, comprising: a plate of substantially rectangular shape having two openings therein forming an outline having a base portion, a top portion and side portions of substantially uniform width, one of said openings being above the other; a transverse strip having the same width as that of the outline strip of the template and lying between said two openings; a plurality of notches on the upper edge of the top portion and lower edge of the base portion of the template being spaced equidistant from one another and defining a series of lines of equal length corresponding to the width of the outline strip of the template; two of the corners on one of the sides of the template being rounded off to a 90° arc and this side having an angular notch with its sides curved to form angles of 90° and having a vertex directed towards the center of said transverse strip; and means for holding the template projecting from said transverse strip capable of serving to complete the tracing of some letters, said holding means being trapezoidal in shape and having a lower free edge parallel to said transverse strip and situated at a distance from the base portion of the template equal to the width of the outline strip.

2. A template as claimed in claim 1, characterized in that the said notches provided in the upper and lower edges are four in number.

3. A template as claimed in claim 1, characterized in that the said notch with curved sides is situated at a height of 60 percent the total height of the template measured from the base portion of the same.

4. A template as claimed in claim 1, characterized in that the said openings are equal.

5. A template for tracing capital letters and numbers as claimed in claim 1 wherein said two openings are of unequal size.

* * * * *